United States Patent
Adar et al.

(10) Patent No.: US 7,734,854 B2
(45) Date of Patent: Jun. 8, 2010

(54) DEVICE, SYSTEM, AND METHOD OF HANDLING TRANSACTIONS

(75) Inventors: Etai Adar, Yokne'am Ilit (IL); Michael Bar-Joshua, Haifa (IL); Ilya Granovsky, Haifa (IL); Shaul Yifrach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 11/969,475

(22) Filed: Jan. 4, 2008

(65) Prior Publication Data

US 2009/0177822 A1    Jul. 9, 2009

(51) Int. Cl.
*G06F 13/36* (2006.01)
(52) U.S. Cl. .................... 710/113; 710/240; 710/39
(58) Field of Classification Search ............... 710/39, 710/40, 4, 52, 60, 112, 113, 116, 123, 308–310, 710/240–242
See application file for complete search history.

(56) References Cited

U.S. PATENT DOCUMENTS

| 5,473,577 | A | * | 12/1995 | Miyake et al. | ............... 365/238 |
| 6,272,600 | B1 | | 8/2001 | Talbot et al. | |
| 6,557,084 | B2 | | 4/2003 | Freerksen et al. | |
| 6,687,821 | B1 | * | 2/2004 | Hady et al. | ............... 713/100 |
| 7,133,981 | B2 | | 11/2006 | Hill et al. | |
| 2002/0069310 | A1 | * | 6/2002 | Scandurra et al. | ........... 710/240 |
| 2004/0103232 | A1 | * | 5/2004 | Clayton | .................. 710/244 |
| 2006/0064532 | A1 | * | 3/2006 | Hur | ........................ 710/309 |
| 2006/0112199 | A1 | | 5/2006 | Sonksen et al. | |

* cited by examiner

*Primary Examiner*—Khanh Dang
(74) *Attorney, Agent, or Firm*—Suzanne Erez

(57) ABSTRACT

Some embodiments include, for example, devices, systems, and methods of handling transactions. In some demonstrative embodiments, an apparatus to handle transactions in a computing system may include a master unit to arbitrate between read and write requests to be issued over a request bus according to at least first and second arbitration schemes. A first ratio between read and write requests issued by the master unit according to the first arbitration scheme may be different from a second ratio between read and write requests issued by the master unit according to the second arbitration scheme.

12 Claims, 3 Drawing Sheets

DEVICE, SYSTEM, AND METHOD OF HANDLING TRANSACTIONS

FIELD OF THE INVENTION

Some embodiments are related to the field of computing, and more particularly to communication among at least one master unit and at least one slave unit.

BACKGROUND OF THE INVENTION

A computer system may include at least one master unit connected with a slave unit, for example, through a common interconnect, e.g., a Processor Local Bus (PLB). The interconnect may include a pipelined request bus to transfer requests from the master unit to the slave unit, and to transfer responses to the requests from the slave unit to the master unit; a write data bus to transfer write data from the master unit to the slave unit; and a read bus to transfer read data from the slave unit to the master unit.

The master unit initiates transactions with the slave unit by issuing transaction requests over the request bus. For example, the master unit initiates a write transaction by issuing a write request for write data over the request bus; and initiates a read transaction by issuing a read request for read data over the request bus. An interconnect controller, e.g., an arbiter, may be implemented to control transactions over the common interconnect.

An immediate transaction may be performed, for example, if the read data is immediately available at the slave unit, or if the write data is immediately available at the master unit. For example, in an immediate write transaction, the slave unit responds to the write request by sending an acknowledgment response over the request bus, and the master unit provides the write data to the slave unit over the write bus. In the immediate read transaction the slave unit responds to the write request by sending an acknowledgment response over the request bus; and the slave unit provides the read data to the master unit over the read bus. A delayed read transaction is performed, for example, if the read data is not immediately available at the slave unit. In such case the arbiter indicates to the master unit that the read request has been accepted, but that the read data associated with the read request may be available at a later time. The master unit may withdraw the read request, and repeat the read request at a later time. Accordingly, in the delayed read transaction the master unit issues at least two transaction requests over the request bus, while in the immediate transactions the master unit issues a single transaction request.

It is desired to maintain a balance between acknowledged read and write requests, e.g., in order to efficiently utilize the read and write busses. The master unit is typically configured to arbitrate between the read and write requests according to a predefined fixed arbitration scheme.

SUMMARY OF THE INVENTION

Some embodiments include, for example, devices, systems, and methods of handling transactions.

In some demonstrative embodiments, an apparatus to handle transactions in a computing system may include a master unit to arbitrate according to at least first and second arbitration schemes between read and write requests to be issued over a request bus. A first ratio between read and write requests issued by the master unit according to the first arbitration scheme may be different from a second ratio between read and write requests issued by the master unit according to the second arbitration scheme.

In some demonstrative embodiments, a method of handling transactions in a computing system includes issuing by a master unit over a request bus read and write requests in accordance with at least first and second arbitration schemes, wherein a first ratio between the read and write requests issued according to the first arbitration scheme is different from a second ratio between read and write requests issued according to the second arbitration scheme.

In some demonstrative embodiments, a system to handle transactions in a computing platform includes a master unit interconnected with a slave unit. The master unit is capable of arbitrating according to at least first and second arbitration schemes between read and write requests to be issued over a request bus. A first ratio between read and write requests issued by the master unit according to the first arbitration scheme is different from a second ratio between read and write requests issued by the master unit according to the second arbitration scheme.

Some embodiments include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
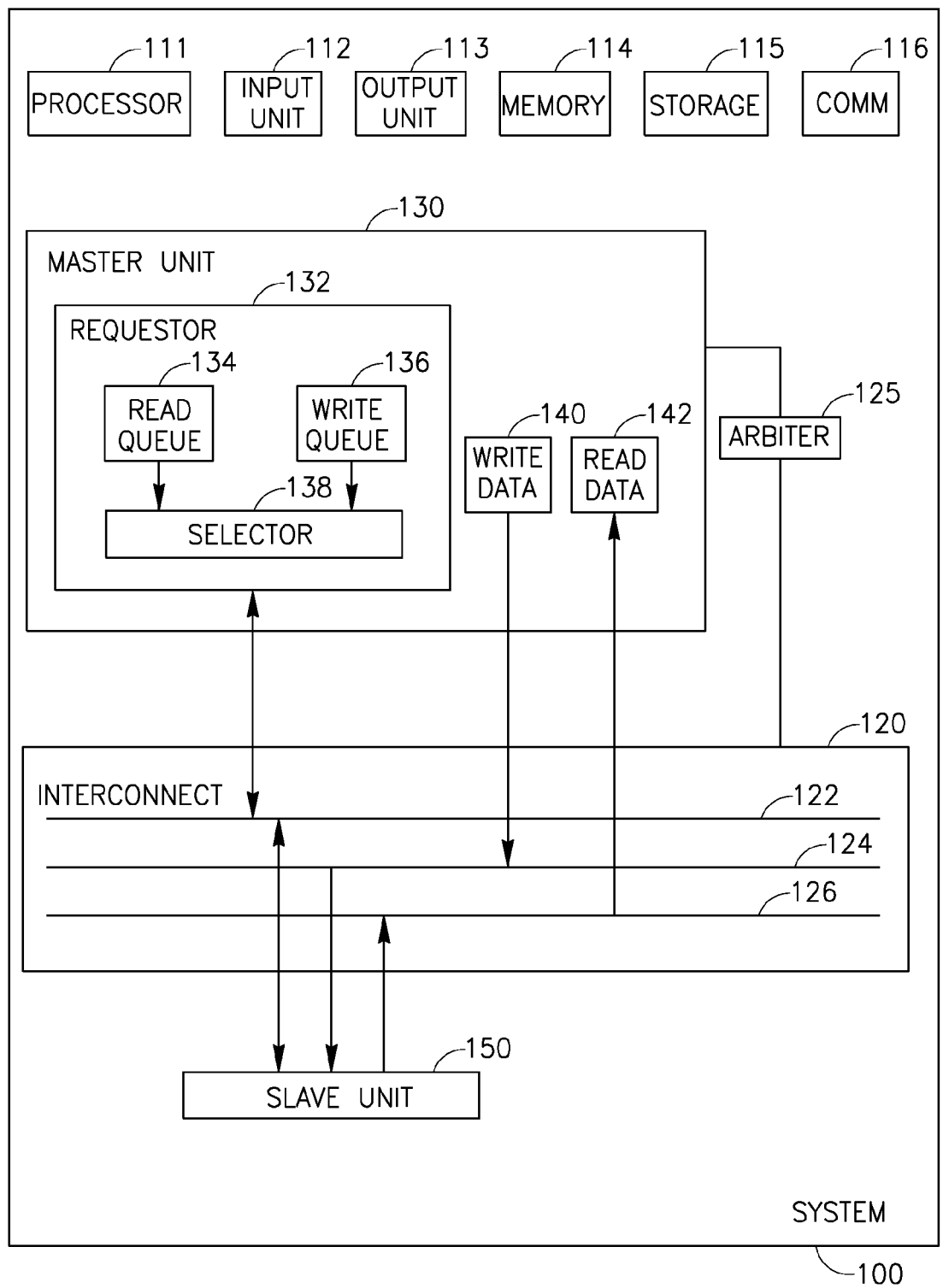
FIG. 1 is a schematic block diagram illustration of a system capable of handling transactions in accordance with some demonstrative embodiments.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Although portions of the discussion herein relate, for demonstrative purposes, a common pipeline such as, for example, a bus or a Processor Local Bus (PLB), embodiments of the invention are not limited in this regard, and may be used in conjunction with other types of interconnect mediums, for example, wired links, wireless links, shared access mediums, systems in which multiple agents or clients compete on services provided by a resource, or the like.

The terms "slave" or "slave unit" as used herein include, for example, a resource, a delayed-transaction resource, a local resource, a remote resource, a resource able to fulfill read requests, a resource able to fulfill write requests, a resource able to fulfill other requests (e.g., requests to perform processing operations), a data serving unit, a server, or the like. For example, in some embodiments, a slave unit may include a hard-disk, a storage unit, a mass storage unit, a Network Interface Card (NIC), or other unit or resource.

The term "master" or "master unit" as used herein includes, for example, a client unit, an agent unit, a local client or agent, a remote client or agent, a client or agent able to send access requests (e.g., read requests, write requests, requests to perform processing operations), or the like. For example, in some embodiments, a master unit may include a processor, a controller, a graphics card, or other unit or agent.

At an overview, some demonstrative embodiments may include dynamically arbitrating between read and write requests to be issued by a master unit over a pipelined interconnect.

In some demonstrative embodiments, the master unit may switch between at least first and second arbitration states to dynamically arbitrate between the read and write requests in accordance with at least first and second arbitration schemes, respectively, based, for example, one a utilization degree of at least one of a read bus and a write bus associated with the interconnect.

In some demonstrative embodiments, the first arbitration scheme includes a weighted round-robin arbitration between the read and write requests. For example, the weighted round-robin arbitration may have a two-to-one preference of read requests over write requests. This arbitration scheme may result in substantially balancing between read transactions and write transactions if, for example, substantially all the read requests are performed as delayed read transactions, which are implemented by issuing two read requests, while a write transaction is implemented by a single write request.

In some demonstrative embodiments, the second arbitration scheme includes a fair arbitration between the read and write requests, e.g., having a one-to-one ratio between the read and write requests issued by the master unit.

In some demonstrative embodiments, the master unit switches from the first arbitration scheme to the second arbitration scheme based, for example, on a relation between a number of write requests and a number of read requests pending in write and read request queues, respectively. For example, a difference between the number of pending write requests and the number of pending read requests may indicate that some or all of the read requests include read requests resulting in non-delayed read transactions. In such case, the write requests may be "discriminated" by the first arbitration scheme. Switching to the second arbitration scheme may result in balancing between the number of the read and write requests pending in the master unit.

In some demonstrative embodiments, the master unit switches from the first arbitration scheme to the second arbitration scheme if the difference between the number of the pending write requests and the number of the pending read requests is equal to or greater than a first threshold value.

In some demonstrative embodiments, the master unit switches from the second arbitration scheme to the first arbitration scheme, for example, if the difference between the number of the pending read requests and the number of the pending write requests is equal to or greater than a second threshold value.

FIG. 1 schematically illustrates a block diagram of a system 100 able to handle transactions in accordance with some demonstrative embodiments. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, and a communication unit 116. System 100 may optionally include other suitable hardware components and/or software components.

Processor 111 may include, for example, a Central Processing Unit (CPU), a Digital Signal Processor (DSP), one or more processor cores, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) of system 100 or of one or more software applications.

Input unit 112 may include, for example, a keyboard, a keypad, a mouse, a touch-pad, a track-ball, a stylus, a microphone, or other suitable pointing device or input device. Output unit 113 may include, for example, a monitor, a screen, a Cathode Ray Tube (CRT) display unit, a Liquid Crystal Display (LCD) display unit, a plasma display unit, one or more audio speakers, or other suitable output devices.

Memory unit 114 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115 may, for example, store data processed by system 100.

Communication unit 116 may include, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 may include, or may be associated with, one or more antennas, for example, a dipole antenna, a monopole antenna, an omni-directional antenna, an end fed antenna, a circularly polarized antenna, a micro-strip antenna, a diversity antenna, or the like.

In some embodiments, components of system 100 may be enclosed in a common housing, packaging, or the like, and may be interconnected or operably associated using one or more wired or wireless links. In other embodiments, components of system 100 may be distributed among multiple or separate devices or locations, may be implemented using a client/server configuration, may communicate using remote access methods, or the like.

System 100 includes at least one master unit 130 connected to at least one slave unit 150 though a common interconnect 120, for example, a pipelined interconnect, e.g., a PLB. Master unit 130 includes, for example, a processor, a controller, a graphics card, or other unit or agent. Master unit 130 is able, for example, to request read transactions from slave unit 150, to request write transactions from slave unit 150, to request processing transactions from slave unit 150, or the like.

Slave unit 150 includes, for example, a hard disk drive, a Network Interface Card (NIC), or other common resource or shared resource able to provide services to master unit 130, or able to fulfill read requests, write requests and/or processing requests of master unit 130. In some embodiments, slave unit 150 is able to support a single outstanding request, and does not support multiple concurrently outstanding requests.

In some demonstrative embodiments, interconnect 120 includes, for example, a request bus 122 to communicate one or more requests, e.g., read, requests, write requests and/or other requests, from master unit 130 to slave unit 150. Request bus also communicates one or more request acknowledgements from slave unit 150 to master unit 130, e.g., in response to the requests. Pipeline also includes, for example, a write bus to communicate write data 140 from master unit 130 to slave unit 150; and a read bus 126 to communicate read data 142 from slave unit 150 to master unit 130. Interconnect 120 may also include one or more other suitable buses.

In some demonstrative embodiments, common pipeline 120 includes, or is associated with, an arbiter 125, for example, an arbitration circuit, an arbitration controller, or other arbitration logic. Arbiter 125 is able to determine and/or grant usage rights or access rights with respect to interconnect 120 and/or slave unit 150. Arbiter 125 is able to allow one or more (e.g., concurrent) pipelined requests across request bus 122.

In some demonstrative embodiments, a read transactions performed between master unit 130 and slave unit 150 over interconnect 120 may include one or more immediate read transactions, e.g., if requested read data is available at slave unit 150 with relatively low latency; and/or one or more delayed read transactions, e.g., if requested read data is available at slave unit 150 with relatively high latency. The immediate read transaction may be preformed using a single read request issued by master unit 130 over request bus 122, while a delayed read transaction may be performed using at least two read requests issued by master unit 130 over request bus 122.

In some embodiments, master unit 130 may not anticipate and/or predict the latency level at slave 150 associated with retrieving read data. Accordingly, master unit 130 may not predict and/or anticipate, e.g., before receiving a response to a read request over request bus 122, whether a read transaction resulting from the read request will be a delayed read transaction or an immediate read transaction.

In some embodiments, master unit 130 may be capable of dynamically arbitrating between read and write requests issued over bus 122 in order, for example, to allow efficient utilization of read and/or write busses, e.g., as described in detail below.

In some embodiments, using a fixed arbitration scheme to issue read/write requests may result in underutilization of the read and/or write busses. For example, issuing the read and write requests according to a first fixed arbitration scheme, for example, a fixed fair arbitration scheme, e.g., at a ratio of one read request per one write request, may result in underutilization of read bus 126 if, for example, a relatively large number of the read requests are part of delayed read transactions. Issuing the read and write requests according to a second fixed arbitration scheme, for example, a fixed weighted arbitration scheme, e.g., at a ratio of two read requests per one write request, may result in underutilization of write bus 124 if, for example, a relatively large number of the read requests are part of immediate read transactions.

In some demonstrative embodiments, master unit 130 has at least first and second read/write arbitration states to arbitrate between read and write requests to be issued over request bus 122 according to at least first and second arbitration schemes, respectively. A first ratio between read and write requests issued by master unit 130 at the first arbitration state is different from a second ratio between read and write requests issued by master unit 130 at the second arbitration state, e.g., as described in detail below.

In some demonstrative embodiments, master unit 130 is capable of switching between the first and second arbitration states based on any suitable criterion. In one example, master unit 130 switches between the first and second arbitration states according to a utilization degree of at least one of read bus 126 and write bus 124, e.g., as described in detail below.

In some demonstrative embodiments, master unit 130 includes a requestor 132 to issue the read and write requests over request bus 122. Requestor 132 may include, for example, a read queue 134 to maintain a plurality of pending read requests to be issued over request bus 122, and a write queue to maintain a plurality of pending write requests to be issued over request bus 122. Queues 134 and 136 may include any suitable queues, e.g., First-In-First-Out (FIFO) queues. Requestor 132 may also include a selector 138 to select one of the first and second arbitration schemes, and to selectively issue the pending read and write requests of queues 134 and 136 in accordance with the selected arbitration scheme, e.g., as described below.

In some demonstrative embodiments, a degree of utilization of read bus 126 and/or write bus 124 may be related to a number of the pending read and/or write requests in queues 134 and/or 136. For example, a first difference between the number of pending read requests and the number of pending write requests may be related to an underutilization of read bus 126, while a second difference between the number of pending write requests and the number of pending read requests may be related to an underutilization of write bus 124.

In some demonstrative embodiments, master unit 130 is capable of switching between the first and second arbitration states based on a difference between the number of the pending write requests and the number of the pending read requests, as described in detail below.

In some demonstrative embodiments, the first ratio of the first arbitration state is different from one. In one example, the first arbitration scheme includes a weighted round-robin arbitration between the read and write requests issued over request bus 122. For example, the weighted round-robin arbitration may have a two-to-one preference of read requests over write requests, such that the first ratio is equal to two. Accordingly, the first arbitration state may result in substantially balancing between read transactions and write transactions over interconnect 120 if, for example, substantially all the read requests are performed as delayed read transactions, which are implemented by issuing two read requests over request bus 122, while a write transaction is implemented by issuing a single write request over request bus 122.

In some demonstrative embodiments, the second ratio of the second arbitration state is equal to one. In one example, the second arbitration scheme includes a fair arbitration between the read and write requests, e.g., having a one-to-one ratio between the read and write requests issued by master unit 130 over request bus 122.

Figure 2:
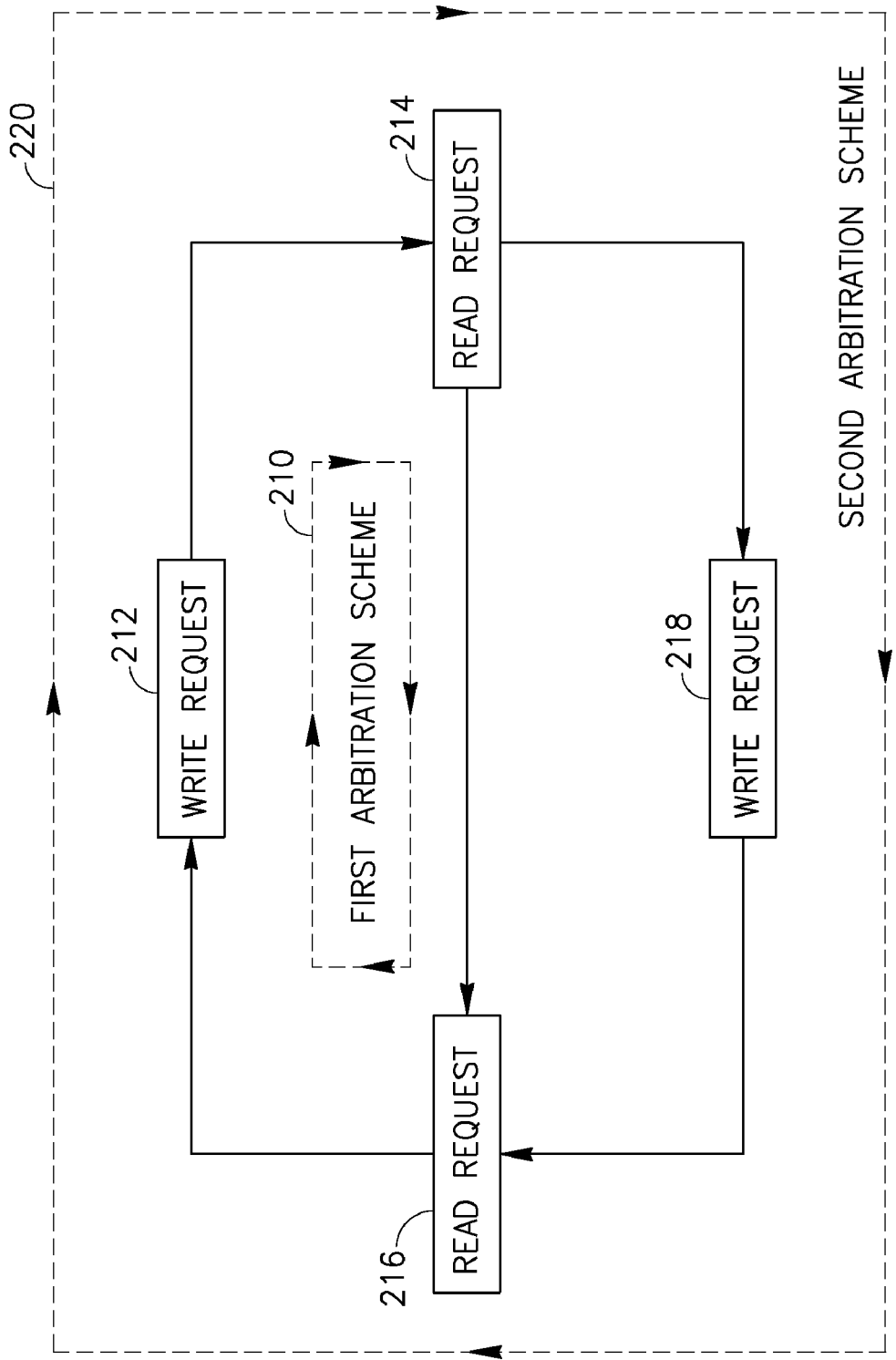
FIG. 2 is a schematic illustration of first and second read/write arbitration schemes in accordance with some demonstrative embodiments.

FIG. 2 is a schematic illustration of a first arbitration scheme 210 and a second arbitration scheme 220 in accordance with some demonstrative embodiments. Although embodiments of the invention are not limited in this respect, in some demonstrative embodiments schemes 210 and/or 220 may be implemented by master unit 130 (FIG. 1), requester 132 (FIG. 1), and/or selector 138 (FIG. 1), for example, to dynamically arbitrate between read and write requests of queues 134 (FIG. 1) and 136 (FIG. 1) issued over request bus 122 (FIG. 1).

In some demonstrative embodiments, arbitration scheme 210 includes a weighted round-robin arbitration scheme. In one example, arbitration scheme 210 includes a sequence of read and write requests at a ratio of two read requests to one write request. For example, arbitration scheme 210 includes a write request 212 followed by a first read request 214 and a second read request 216. Read requests 214 and 216 may include, for example, either a read request initiating a delayed read transaction with a slave unit, or a read request to fetch read data available at the slave unit.

Arbitration scheme 210 may be implemented, for example, to perform read and write transactions, e.g., if the read transactions are assumed to include delayed read transactions requiring the issuance of two read requests per read transaction, while the write transactions include immediate write transactions requiring the issuance of a single write request per write transaction.

In some demonstrative embodiments, arbitration scheme 220 includes a fair one-to-one arbitration scheme. In one example, arbitration scheme 220 includes a sequence of read and write requests at a ratio of one read request to one write request. For example, arbitration scheme 220 includes read request 214 followed by write request 212, read request 214, and a write request 218.

Arbitrations scheme 220 may be implemented, for example, to efficiently perform read and write transactions, e.g., if the read transactions are assumed to include immediate read transactions requiring the issuance of a single read request per read transaction, and the write transactions include immediate write transactions requiring the issuance of a single write request per write transaction.

Figure 3:
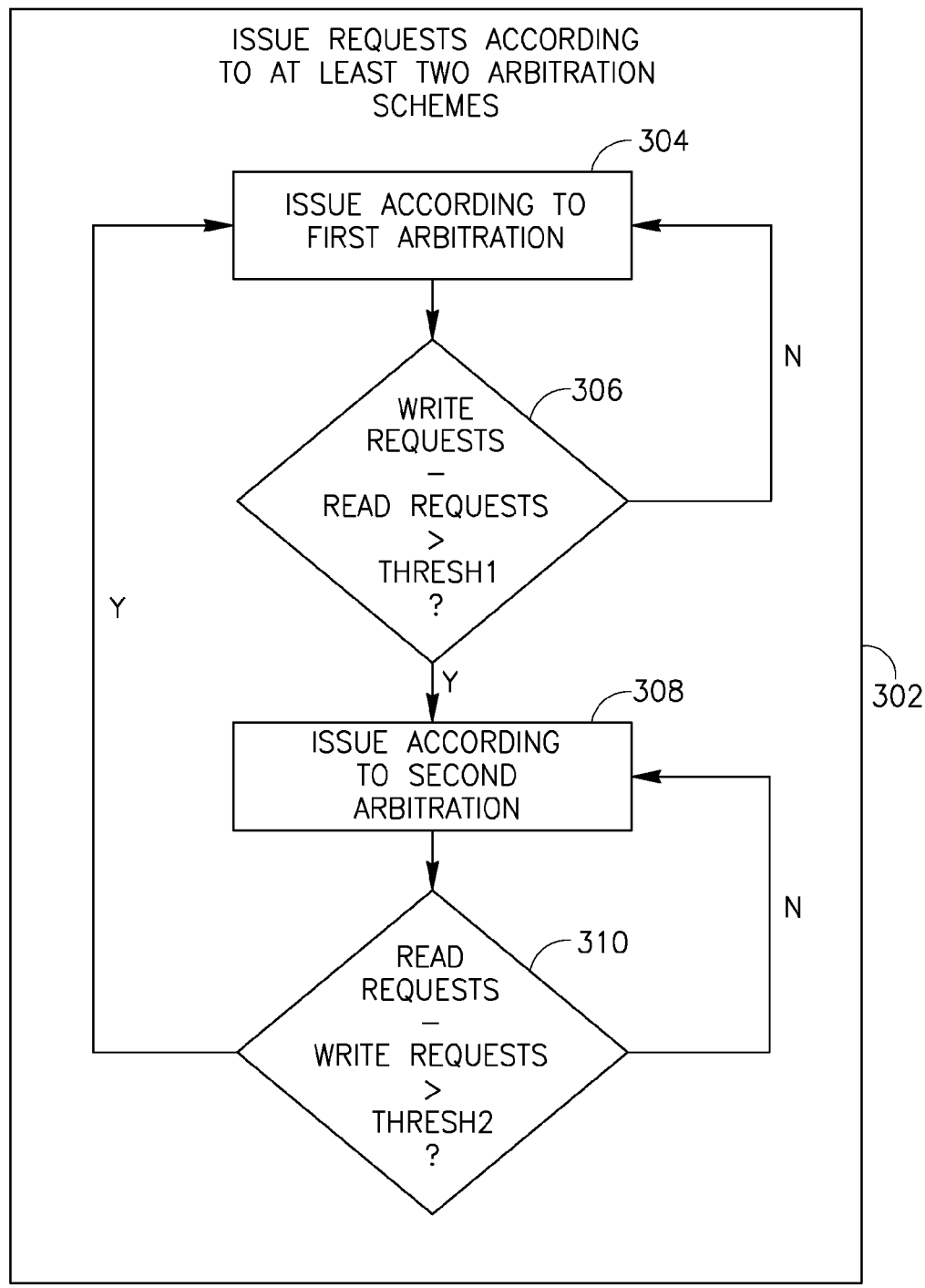
FIG. 3 is a schematic flow-chart illustration of a method of handling transactions in accordance with some demonstrative embodiments.

Reference is made to FIG. 3, which schematically illustrates a method of handling transactions in accordance with some demonstrative embodiments. Although embodiments of the invention are not limited in this respect, in some demonstrative embodiments one or more operations of the method of FIG. 3 may be implemented by system 100 (FIG. 1), by master unit 130 (FIG. 1), requester 132 (FIG. 1), and/or selector 138 (FIG. 1), for example, to dynamically arbitrate between read and write requests of queues 134 (FIG. 1) and 136 (FIG. 1) issued over request bus 122 (FIG. 1).

As indicated at block 302, the method may include issuing over a request bus read and write requests in accordance with at least two read/write arbitration schemes, e.g., as described below. For example, master unit 130 (FIG. 1) may have at least two read/write arbitration states to arbitrate between read and write requests to be issued over request bus 122 (FIG. 1) according to at least two arbitration schemes, respectively, e.g., as described above.

As indicated at block 304, the method may include issuing read and write requests according to a first arbitration scheme. For example, master unit 130 (FIG. 1) may issue the read and write requests over request bus 122 (FIG. 1) according to arbitration scheme 210 (FIG. 2), e.g., as described above.

As indicated at block 308, the method may include issuing read and write requests according to a second arbitration scheme. For example, master unit 130 (FIG. 1) may issue the read and write requests over request bus 122 (FIG. 1) according to arbitration scheme 220 (FIG. 2), e.g., as described above.

In some demonstrative embodiments, a first ratio between the read and write requests issued according to the first arbitration scheme may be different from a second ratio between read and write requests issued according to the second arbitration scheme. For example, the first arbitration scheme may have a ratio of two read requests to one write request, and/or the second arbitration scheme may have a ratio of one read request to one write request, e.g., as described above.

In some demonstrative embodiments, the method may include switching between the first and second arbitration schemes in accordance with a suitable criterion, for example, a utilization degree of at least one of a read bus and a write bus associated with the request bus. For example, in some demonstrative embodiments, the method may include switching between the first and second arbitration schemes based on a relation between a number of a plurality of pending write requests and a number of a plurality of pending read requests, e.g., above.

As indicated at block 306, in one example the method may include switching between the first arbitration scheme and the second arbitration scheme based on a difference between the number of the plurality of pending write requests and the number of the plurality of pending read requests. For example, the method may include switching from the first arbitration scheme to the second arbitration scheme, if the difference between the number of the plurality of pending write requests and the number of the plurality of pending read requests is equal to or greater than a first threshold value, e.g., as described above.

As indicated at block 310, in one example the method may include switching between the second arbitration scheme and the first arbitration scheme based on a difference between the number of the plurality of pending read requests and the number of the plurality of pending write requests. For example, the method may include switching from the second arbitration scheme to the first arbitration scheme, if the difference between the number of the plurality of pending read requests and the number of the plurality of pending write requests is equal to or greater than a second threshold value, e.g., as described above.

Other suitable operations or sets of operations may be used in accordance with embodiments of the invention.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus to handle transactions in a computing system, the apparatus comprising:
   a slave unit;
   a request bus;
   a read bus for communicating read data from the slave unit;
   a master unit connected to the read bus and operative to issue read requests, the read requests comprising immediate read requests, and delayed read requests and to issue write requests over the request bus to the slave unit, wherein the immediate read requests have the read data available from the slave unit at relatively short latencies and are performed as a single request and the delayed read requests have read data available from the slave unit at relatively long latencies and are performed by initiating respective first requests over the request bus and thereafter issuing second requests over the request bus to fetch the read data from the slave unit; and an arbiter adapted to select, responsively to a non-ideal utilization of the read bus, one of at least first and second arbitration schemes for issuing the read requests and the write requests, wherein a first ratio between the read requests and the write requests according to the first arbitration scheme is different from a second ratio between the read requests and the write requests according to the second arbitration scheme, the master unit cooperative with the arbiter to obtain a balance between read transactions with the slave unit and write transactions with the slave unit by issuing the delayed read requests in accordance with a selected one of the first arbitration scheme and the second arbitration scheme.

2. The apparatus of claim 1, further comprising:
   a read queue to maintain a plurality of read requests; and
   a write queue to maintain a plurality of write requests, wherein making a comparison comprises determining a relation between a number of the plurality of write requests in the write queue and a number of the plurality of read requests in the read queue.

3. The apparatus of claim 2, wherein the master unit is operative to switch from the first arbitration scheme to the second arbitration scheme when a difference between the number of the plurality of write requests and the number of the plurality of read requests is equal to or greater than a predefined threshold.

4. The apparatus of claim 2, wherein the master unit is operative to switch from the second arbitration scheme to the first arbitration scheme, when a difference between the number of the plurality of read requests and the number of the plurality of write requests is equal to or greater than a predefined threshold.

5. The apparatus of claim 1, wherein the first ratio is different from one, and wherein the second ratio is equal to one.

6. The apparatus of claim 1, wherein the first ratio comprises a ratio of two read requests to one write request, and wherein the second ratio comprises a ratio of one read request to one write request.

7. A method of handling transactions in a computing system, the method comprising:
   issuing read requests comprising immediate read requests having read data available from on a read bus from a slave unit at relatively short latencies and delayed read requests having read data available from the slave unit at relatively long latencies, the immediate read requests being issued as single requests over a request bus and the delayed read requests being issued as respective first requests over the request bus and thereafter as second requests over the request bus to fetch the read data from the slave unit;
   selecting, responsively to a non-ideal utilization of the read bus, one of at least first and second arbitration schemes, wherein a first ratio between the read requests and write requests issued according to the first arbitration scheme is different from a second ratio between the read requests and the write requests issued according to the second arbitration scheme; and
   performing delayed read transactions by issuing the delayed read requests on the request bus in accordance with a selected one of the first arbitration scheme and the second arbitration scheme to fetch the read data from the slave unit, the delayed read transactions comprising first read requests and second read requests over the request bus.

8. The method of claim 7, comprising:
maintaining a plurality of read requests in a read queue;
maintaining a plurality of write requests in a write queue; and
switching between the first and second arbitration schemes based on a relation between a number of the plurality of write requests in the write queue and a number of the plurality of read requests in the read queue.

9. The method of claim 8, wherein issuing the delayed read requests comprises switching from the first arbitration scheme to the second arbitration scheme when a difference between the number of the plurality of write requests and the number of the plurality of read requests is equal to or greater than a predefined threshold.

10. The method of claim 8, wherein issuing the delayed read requests comprises switching from the second arbitration scheme to the first arbitration scheme, when a difference between the number of the plurality of read requests and the number of the plurality of write requests is equal to or greater than a predefined threshold.

11. The method of claim 7, wherein the first ratio is different from one, and wherein the second ratio is equal to one.

12. The method of claim 7, wherein the first ratio comprises a ratio of two read requests to one write request, and wherein the second ratio comprises a ratio of one read request to one write request.

* * * * *